United States Patent [19]
Keough et al.

[11] 3,743,887
[45] July 3, 1973

[54] POWER SUPPLY FOR AN ELECTRONIC PABX

[75] Inventors: Timothy James Keough, Woodridge; Charles James Kalensky, Chicago, both of Ill.

[73] Assignee: International Telephone and Telegraph Corporation, New York, N.Y.

[22] Filed: Mar. 24, 1972

[21] Appl. No.: 237,973

Related U.S. Application Data

[63] Continuation of Ser. No. 36,942, May 13, 1970, abandoned.

[52] U.S. Cl............... 317/16, 317/31, 317/33 VR, 317/33 SC, 321/14, 323/24
[51] Int. Cl............................................. H02h 3/38
[58] Field of Search ................. 321/14, 18; 323/24; 317/33 VR, 33 SC, 31, 16

[56] References Cited
UNITED STATES PATENTS

| | | | |
|---|---|---|---|
| 3,305,763 | 2/1967 | Kupferberg et al............. | 321/18 X |
| 3,354,378 | 11/1967 | Jewett................... | 321/14 |
| 3,577,177 | 5/1971 | Hewlett.................... | 323/24 X |

Primary Examiner—James D. Trammell
Attorney—C. Cornell Remsen, Delbert P. Warner et al.

[57] ABSTRACT

A compact power supply characterized by low heat dissipation is provided. Phase control of main silicon controlled rectifiers is provided by cosine modified ramp and pedestal control. Overvoltage and overcurrent conditions are detected by SCRs and relay means which reduce the amplitude of control signals to the main SCRs thus turning off the output of the system to prevent damage.

5 Claims, 6 Drawing Figures

INVENTORS
TIMMOTHY J. KEOUGH
CHARLES J. KALENSKI
BY

Delbert O. Warner
ATTORNEY

POWER SUPPLY FOR AN ELECTRONIC PABX

This is a continuation of application Ser. No. 36,942, filed May 13, 1970, now abandoned.

The present invention relates to power supplies and particularly to power supplies for electronic PABXs.

The prior art power supply systems for PABXs have involved the use of large transformers and massive rectifier circuits. Such systems have functioned well in the past, but have consumed much power, have taken up relatively large amounts of space, have produced great quantities of heat, have required large cabinets and have required the use of much cooling equipment.

With modern PABX switching systems employing solid state equipment the requirements for electrical power have been reduced. In addition, solid state components take up very little space and it is desirable to reduce the space requirements for power supplies proportionately.

It is an object therefore of the present invention to provide power supplies which are compact. This is so that the power supplies will not require an inordinate amount of cabinet space when compared with the space required for the switching system itself.

It is a further object of this invention to provide power supplies which dissipate very little heat. In this way, it is possible to avoid loss of power in the form of heat as well as the loss of power required to operate cooling equipment.

In addition to the foregoing objects, it is an object of the invention to provide improvements in the power supply relating to protection against overloads, protection from overvoltage and protection in the event of a short circuit.

In order to accomplish the foregoing objects and others ancillary thereto, a power supply is provided in which two SCRs in a bridge circuit are alternatively turned on by control signals to produce a full-wave rectified voltage from an ac source. The control signals are produced from a second circuit which includes a second bridge circuit functioning as a full-wave rectifier energized by the same ac source. Signals from the rectifier in the second circuit are processed by zener diodes and the resulting modified signals are compared with system output voltages in a differential amplifier to provide a difference volgage. This difference voltage is used to establish a pedestal voltage in a unit junction transistor oscillator. The output of the rectifier is fed directly to the emitter timing circuit of the UJT oscillator to add a cosine wave (cosine ramp function) to the pedestal voltage. The output pulses from the UJT are used to trigger two additional SCR gates alternately. These additional SCR gates in turn provide firing voltages for the main SCRs.

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 is a block diagram illustrating the overall system,

FIGS. 2a and 2b together form a schematic diagram showing an embodiment of the invention in detail, FIG. 2 shows how FIGS. 2a and 2b should be combined, and FIGS. 3 and 4 present waveforms of use in attaining an understanding of the invention.

GENERAL DESCRIPTION

The EPABX power modules are basically regulated SCR phase-controlled DC power supplies which utilize cosine-modified ramp and pedestal control. Although some specific differences in circuitry exist between various modules employed in the practice of the invention, the basic operation of each is the same.

In general, power modules according to the invention operate in the following manner, referring to the block diagram in FIG. 1. A thyrector diode TH1 is connected across the incoming AC line indicated at terminal 2, to provide transient voltage protection for the power semi-conductors. The AC voltage from 2 is then impressed across a full wave SCR/diode bridge rectifier indicated by block 4. The bridge SCRs (main SCRs) are phase controlled by circuitry located within the dotted block 6. The operation of this phase control circuitry will be discussed in the following paragraph. The output of the bridge is heavily filtered by a L-C network at 8. A Free Wheeling Diode (FWD) provides a fast reverse recovery time to overcome the $L^{di}/dt$ effect of the filter inductance when the bridge SCRs are reverse biased. The output of the supply is current overload protected by means of a current sensitive relay indicated by block 10 and is over-voltage protected by a crowbar SCR type circuit, indicated by block 12.

The main SCRs in the input bridge 4 are phase-controlled in the following manner. A separate A-C input on terminal 20 is impressed across a transformer T1 and a full-wave diode bridge at 22. The output of the bridge rectifier 22 is fed directly to resistors R1 and R2. The other side of R2 is connected to the emitter timing circuit of a UJT relaxation oscillator or Unit Junction Transistor relaxation oscillator 24. This adds a cosine wave to the UJT emitter circuit and compensates for the sinusoidal supply voltage. The result is a linear transfer characteristic for the entire regulator.

The resistor R1 acts as a dropping resistor for a zener regulator 26. The output of a zener reference 28 is connected to one input side of a differential amplifier at 30. The other input side of the amplifier at 30 is connected to the output of a proportional voltage divider 32. The input to the divider is taken from the D C Voltage Output terminal 50.

Under normal operating conditions, the value of the output D C voltage will lie within a certain specified voltage range and the differential voltage ($\Delta E$) between the zener reference and the voltage divider will be near zero, where $\Delta E = Vz - Vfb$. The output $\Delta E$ of the differential amplifier at 31 supplies current to the pedestal network 24 and establishes the amplitude of the pedestal in relation to the peak point (trigger) voltage of a unit junction transistor UJT. Superimposed on this pedestal is the cosine-modified ramp voltage. The PRF of the UJT trigger circuit is present by the choice of components in the timing circuit, voltage divider, differential amplifier and zener reference. Changes in $\Delta E$ (error voltage) raise and lower the pedestal voltage depending on the polarity of $Vfb$ with respect to the zener reference ($Vz$). This in turn increases or decreases the period of the UJT relaxation oscillator. The UJT output pulse is synchronized to the AC input line by virtue of its full wave sinusoidal supply voltage.

The output pulse from the UJT trigger circuit is coupled through a pulse transformer at 34 to the SCR Gating Circuits at 36. Since the Main SCRs located in the Full Wave SCR/Diode Bridge 4 operate into a high reactive load, the additional SCR circuit at 36 operating into a resistive load with zener voltage limiting is employed to trigger the gates of the main SCRs. In this way $dv/dt$ firing problems are avoided.

The two Main SCRs in the bridge rectifier 4 are each triggered on alternate cycles of the input AC waveform at a firing angle predetermined by the UJT trigger circuits 24 and the Differential Amplifier 30.

In the event that the output DC Voltage of the power module should increase or decrease this will result in a corresponding change in feedback voltage ($Vfb$) to the Differential Amplifier. The error voltage ($\Delta E$) will change accordingly and the period of the UJT will increase or decrease; retarding or advancing the firing angle of the Main SCRs. This of course will result in a corresponding increase or decrease in output voltage. When the output is within specifications, the error voltage ($\Delta E$) will again be near zero and the firing angle for the Main SCR will correct for proper output voltage.

The slow starting capacitor C2 is employed to bring all the power modules up to their rated voltages slowly and uniformly to allow for capacitive loading effects. In the event of a current overload the current sensitive relay 10 in the current protect circuit closes and a SCR in the over-current circuit 14, is fired. The SCR illuminates a fault indicator lamp 16 and discharges the slow start capacitor. The trigger from the UJT gate circuit is inhibited and the conductor of the Main SCRs is decreased to a minimum. The output current decreases accordingly and the current relay drops out. Now the slow start capacitor begins to re-charge and eventually reaches the voltage where the UJT circuit is allowed to operate. If the short circuit is still present, the entire process will be repeated. Each time this automatic reset feature occurs the fault indicator will flash, thereby localizing the fault to the module level. The reset process is limited to a preset number of operations by circuitry external to the power modules.

Essentially the same process occurs when an overvoltage condition exists. The output voltage is fed to the Overvoltage circuitry 18 and an SCR at 12 is fired if the voltage is too high. This SCR is crow-barred across the D C voltage output of the supply and short-circuits the output when fired. This causes the current sensitive relay to close and the process discussed above occurs. The fault indicator 16 flashes as explained above, thereby localizing the fault.

DETAILED DESCRIPTION

Figure 2:
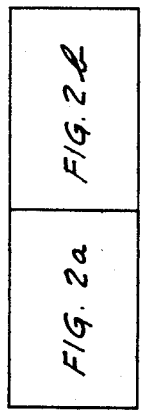
Figure 2B:
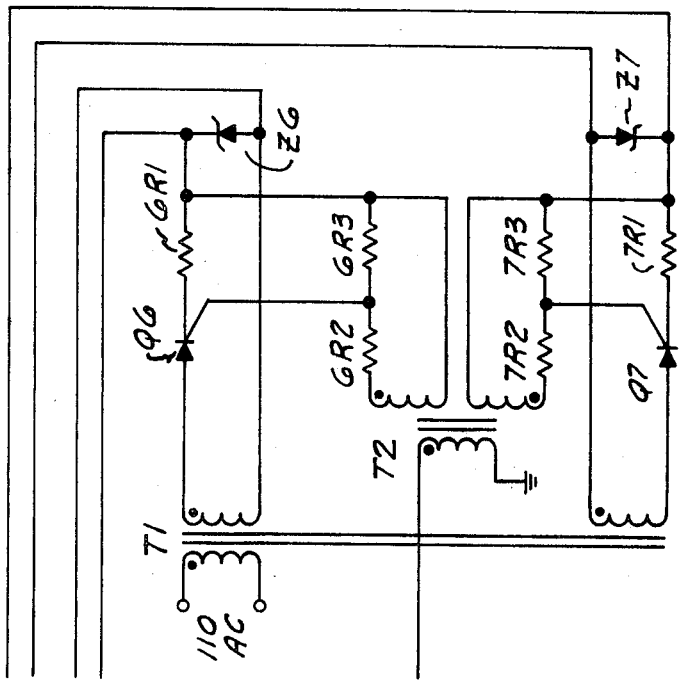
Figure 2A:
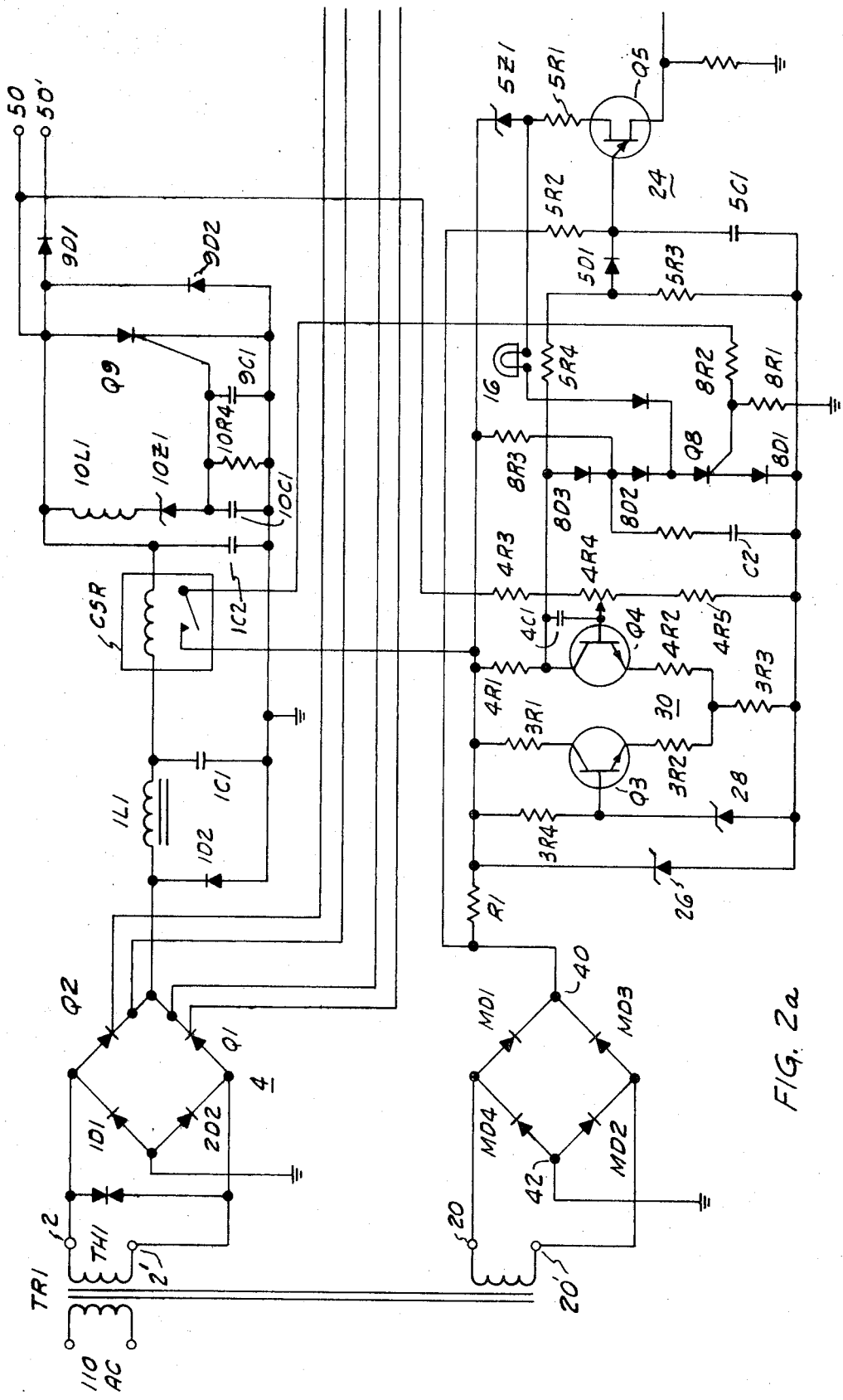

Refer now to the schematic drawing in FIGS. 2a and 2b for an exemplary power supply module in accordance with the invention. The input A C voltage to the full wave SCR/Diode bridge is stepped down to 16 VAC (rms) across terminals 2, 2' by the power transformer TR1. The General Electric thyrector TH1 is placed across the A C input line to provide voltage transient protection for the supply. For a +5VDC supply the thyrector diode is rated at 25VAC (rms). The thyrector will clip transient voltages at 150 to 200 percent of its rated recurrent peak voltage.

The full-wave bridge 4 consists of two diodes and two Main SCRs. They are connected, in this example, for a positive voltage output. The Main SCRs are phase controlled by the circuitry associated with their gates. Initially it is assumed that the two Main SCRs Q1 and Q2 are not conducting (gates off) and produce no output voltage.

Assume that 110VAC from the power transformer TR1 is connected via terminals 20 and 20' across the full wave diode bridge MD1, MD2, MD3, MD4, so that a positive rectified full-wave, formed of segments of a sine wave, occurs across the terminals 40, 42.

The output voltage of the full-wave diode bridge MD1, MD2, MD3, MD4 is connected through a large resistor 5R2 to the timing capacitor 5C1 of the Unijunction Relaxation Oscillator. This capacitance causes a phase shift in the sinusoidal supply voltage and produces a cosine waveform.

The output of the diode bridge is also connected to a dropping resistor R1. This resistance acts in conjunction with a 30V zener regulator diode 26. The supply voltage to the Differential Amplifier formed using transistors Q3 and Q4 is, therefore, a clipped sine wave of 30 volts ± 10 percent amplitude. The resistor 3R4 and the 3.6 volt zener diode 28 provide a reference voltage circuit for the differential amplifier. The cathode of the zener 28 is connected to the base of Q3. The base of the other NPN transistor Q4 in the differential amplifier 30 is connected to a proportional D C voltage divider 32 formed by resistors 4R3, 4R4, 4R5.

Figure 1:
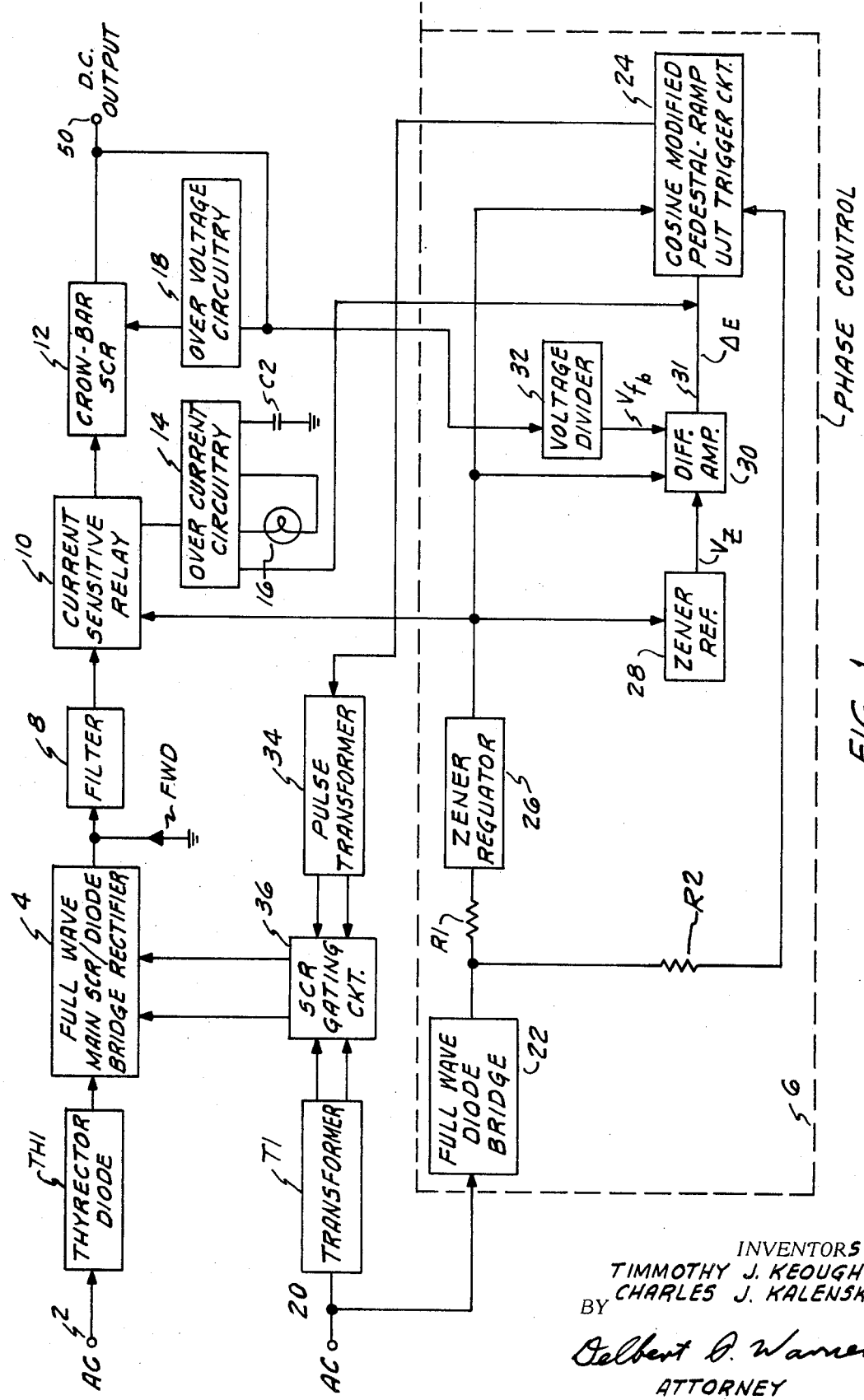
Figure 3:
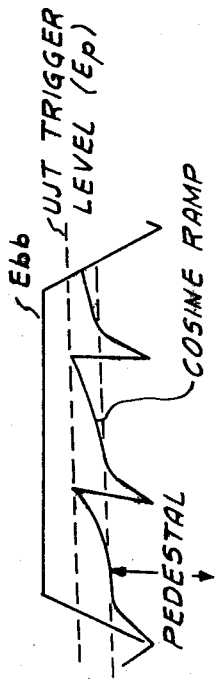

A capacitor 4C1 is connected between the base and collector of Q4 to cancel ripple from the collector of Q4 which otherwise causes erratic firing of the main SCRs Q1 and Q2. One side of the divider is connected to the D C output of the supply at terminal 50 and the other side is connected to ground. The potentiometer 4R4 in the divider is adjusted to provide +5VDC at the supply output into a nominal load. When this occurs the voltage at the collector of the output transistor Q4 is divided by the resistor network 5R4, 5R3. This network of 5R4, 5R3 provides a pedestal voltage across the capacitor 5C1 as it is charged through the series diode 5D1. To this pedestal voltage the previously mentioned cosine wave on capacitor 5C1 is added over the resistor 5R1 to produce the waveform shown in FIG. 3. Note that the R-C Time Constant of the pedestal is much less than that of the cosine ramp path. The pedestal, therefore, is established rapidly and the ramp increases very slowly. In other words the $dv/dt$ of the ramp is much less than that of the pedestal.

The UJT relaxation oscillator supply voltage (Ebb) is approximately +20VDC in amplitude and is a modified sine wave. The result of using a cosine modified ramp and a sinusoidal supply voltage for all the supply modules is a linear output voltage transfer characteristic. That is, the D C output voltage changes linearly with respect to pedestal voltage changes.

Since the supply voltage of the UJT is sinusoidal, the relaxation oscillator is reset every half cycle when the sinusoidal voltage goes to zero. In this manner the trigger pulses from the oscillator to the SCR gates are synchronized to the A C line voltage. Note also that the UJT triggers several times during one half cycle. However, only the first trigger should gate the SCRs. When the cosine ramp reaches the trigger voltage of the UJT, it turns on and a positive pulse occurs at Base 1. This pulse is coupled by means of a 1:1:1 pulse transformer T2 to the gate circuits of the SCRs Q6 and Q7. Between Q6 and Q7, the SCR having a positive anode will fire. The resistor divider network 6R1, 6R2, 6R3 and 7R1, 7R2, 7R3 on each SCR gate assures that proper gate current ($i_{GT}$) and gate voltage ($V_{GT}$) for SCR firing is furnished to the gates and that the gate dissipation rating is not exceeded.

Firing one of the gate circuit SCRs results in a positive modified sine wave of approximately 18 volts peak amplitude appearing at its cathode. The conduction angle of the modified sine wave is determined by the relationship between the UJT output trigger and the start of the transformer secondary voltage wave form.

The time between the start of the secondary voltage and the trigger is determined by the intrinsic ratio of the UJT, the UJT supply voltage amplitude, the amplitude of the pedestal, the rate of change of the cosine ramp and the RC charging rate of a timing capacitor. When all these factors are correct and the input A C is 16VAC and the output voltage is +5VDC the conduction angle of the SCR should be approximately 90°.

Figure 4:
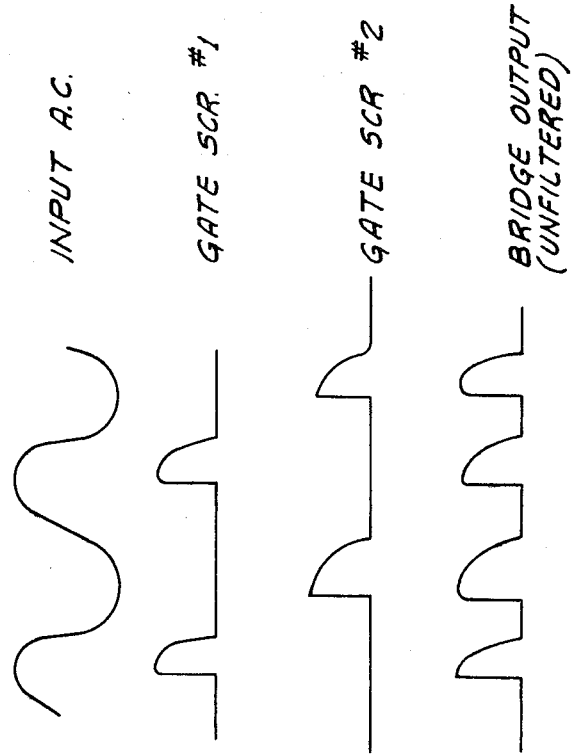

The cathode voltage of the gate scr is clipped by a 5.6V Zener Z6 or Z7 to insure that the maximum forward gate voltage ($V_{GFM}$) and maximum gate current ($I_{GFM}$) are not exceeded. This prevents excessive gate dissipation in the gate circuits of the main SCRs Q1 and Q2. The two gate SCRs Q6 and Q7 fire in an alternate manner. Therefore, the main SCRs fire on alternate half-cycle of the input A C waveform. This results in modified full wave rectification as shown in FIG. 4. The conduction angle of the output of the bridge is approximately 180°. The peak output amplitude of the bridge output is approximately 20 volts when typical forward drop of the semiconductors is considered.

The large inductor 1L1 (5 millihenries) which follows the bridge tends to maintain a holding current through the SCR Q9 when the line voltage goes to zero, preventing commutation. The Free Wheeling Diode 1D2 provides a by-pass for this current. The reverse recovery time of 1D2 is very fast to overcome the L$di/dt$ effect of the inductor.

SHORT CIRCUIT PROTECTION

The output of the Main bridge is heavily filtered by 1L1, 1C1 and 1C2 to reduce A C ripple. The filter includes a current sensitive relay CSR whose pull-in current is 25 amperes. In the event of a short circuit, the contacts of the relay are closed and send the +30V zener clipped sine wave supply to the 180 ohms and 18 ohms voltage dividers 8R1, 8R2 in the gate circuit of the current overload SCR Q8. The divider provides the proper gate voltage and current to fire the SCR Q8. When this occurs current flows through the indicator lamp 16 and it illuminates. Even more important is the fact that current flowing from the Differential Amplifier to the pedestal network is diverted through the SCR. This decreases the pedestal to a minimum amplitude of approximately 4 volts which corresponds to the voltage drops across three diodes and an SCR. This inhibits the trigger pulse from the relaxation oscillator and prevents the firing of the Main SCRs. The slow Start Capacitor C2 which is located external to and is common with a number of individual power sources is discharged through the overcurrent SCR, Q8, when it fires. This turns off the power source by pulling down the pedestal voltages and preventing the Main SCRs from triggering. The failure lamp 16 is illuminated to indicate the failure.

When the Main SCRs commutate, the output source voltage and current drop to zero. The current sensitive relay drops out and its contacts open. This removes the gate drive to the overcurrent SCR, Q8, and it commutates. The fault light extinguishes and the slow start capacitor C2 begins to charge through the diode path provided in each power source. It continues to charge until the diode is back biased. Then the Differential Amplifier output re-establishes the pedestal after the proper delay time determined by the pedestal and cosine ramp, the UJT fires and triggers the gate SCRs Q6, Q7 which trigger the Main SCRs.

If the short condition has been removed, the supplies will continue to operate in their normal manner. If the short is still present the contacts of the current relay will close, the overcurrent SCR (Q8) will fire and the whole procedure repeats again.

OVERVOLTAGE PROTECTION

The overvoltage protection circuit operates in the following manner. Under normal voltage, the D C output voltage which is fed back to the crow-bar SCR gate circuit 10L1, 10Z1, 10R4, 10C1 is not sufficient to turn on the zener diode. Therefore, no gate voltage or current is provided to the crow-bar SCR gate and it remains off. When the D C output voltage rises out of specification sufficiently enough to break down the zener, a gate voltage and current are supplied to the crow-bar SCR Q9. The SCR fires and acts as a short on the output of the power supply. Excessive current is drawn through the current sensitive relay CSR and its contacts close. This fires the overcurrent SCR (Q8) as explained above. The cycle described above for overcurrent begins again and repeats. The only difference between the occurrences for overcurrent and overvoltage is that on each reset period the crow-bar SCR will fire and pull in the current sensitive relay for overvoltage conditions. The SCR crow-bar does not fire for overcurrent conditions and only the current relay is pulled in. The choke 10L1 and the capacitors 9C1 and 10C1 in the crow-bar SCR gate circuit are used for transient protection.

The current delivering capability of the power sources is limited by the current rating of the filter choke 1L1. For a +5VDC supply, the choke is rated at 22.5 amps, the current sensitive relay is rated 25 amps and the rated output current (full load) for the supply is 20 amps.

While the principles of the invention have been described above in connection with specific apparatus and application, it is to be understood that this description is made only by way of example and not as a limitation on the scope of the invention.

We claim:
1. A power supply for an electronic system comprising two main SCRs connected in adjacent arms of a first bridge circuit responsive to an AC power supply voltage and to control voltages to provide a desired DC output voltage, a second bridge circuit coupled to receive a voltage proportional to said AC power supply voltage and provide a pulsating DC voltage, means coupling said pulsating DC voltage to a capacitor to produce a cosine ramp voltage across said capacitor, a source of reference voltage, a differential amplifier coupled to compare the reference voltage with the DC output voltage of the system and to provide a difference voltage in accordance with the difference, means for receiving said difference voltage and providing a pedestal voltage proportional thereto, means for receiving said cosine ramp voltage and said pedestal voltage and forming an intermediate voltage proportional to the sum of said voltages, and two gate SCRs coupled to be energized alternately by the intermediate voltage, said two gate SCRs directly providing separate control voltages to energize respective main SCRs in adjacent arms of the second bridge circuit.

2. A power supply as claimed in claim 1, in which the second bridge circuit forms a full-wave rectifier for providing said pulsating DC voltages, and the reference voltage is provided by a zener diode placed across said pulsating DC voltage.

3. A power supply as claimed in claim 1, in which the second bridge circuit forms a full-wave rectifier for providing said pulsating DC voltages and the means for forming an intermediate voltage includes a unit junction transistor.

4. A power supply as claimed in claim 1, in which means are provided for protecting the power supply against excessive current levels, said means including a current sensitive relay responsive to current above a certain level to close contacts and energize a current overload SCR, said current overload SCR including connections to reduce the pedestal voltage, and thus lower the intermediate voltage and the control signals below levels necessary to turn on the two SCRs in the second bridge.

5. A power supply as claimed in claim 4, in which means are provided for protecting the system from an overvoltage, said means including a zener diode and a SCR connected across output terminals of the system, said zener diode responding to overvoltage to conduct, means coupling the zener diode to control the SCR across the output to produce a short circuit through the SCR when the zener conducts, said short circuit causing operation of said means for protecting against excessive current levels.

* * * * *